United States Patent [19]
Isozaki et al.

[11] Patent Number: 4,943,881
[45] Date of Patent: Jul. 24, 1990

[54] HEAD SUPPORTING STRUCTURE IN DISK DRIVE SYSTEM FOR DOUBLE SIDED FLEXIBLE DISK

[75] Inventors: Shin Isozaki, Kamakura; Michio Yagi, Hachioji, both of Japan

[73] Assignee: Konica Corporation, Tokyo, Japan

[21] Appl. No.: 221,224

[22] Filed: Jul. 19, 1988

[30] Foreign Application Priority Data

Jul. 29, 1987 [JP] Japan .................................. 62-187834

[51] Int. Cl.$^5$ ................................................ G11B 5/48
[52] U.S. Cl. ...................................... 360/104; 360/105
[58] Field of Search ............................... 360/104–106, 360/102–103, 99.05, 99.01, 130.1

[56] References Cited

U.S. PATENT DOCUMENTS

| | | | |
|---|---|---|---|
| 4,291,350 | 9/1981 | King et al. ........................... | 360/104 |
| 4,306,260 | 12/1981 | Maeda et al. ....................... | 360/105 |
| 4,363,045 | 12/1982 | Herman ............................... | 360/104 |
| 4,646,181 | 2/1987 | Morigaki ............................. | 360/104 |
| 4,651,245 | 3/1987 | Kanno ................................. | 360/104 X |
| 4,724,500 | 2/1988 | Dalziel ................................ | 360/103 |
| 4,807,070 | 2/1989 | Isozaki et al. ....................... | 360/104 |
| 4,811,143 | 3/1989 | Ohashi et al. ....................... | 360/105 |
| 4,819,108 | 4/1989 | Seki et al. ............................ | 360/104 |

*Primary Examiner*—John H. Wolff
*Attorney, Agent, or Firm*—Jordan B. Bierman

[57] ABSTRACT

A mechanism for supporting a pair of magnetic core heads for reading and writing magnetic codes of a flexible disk having magnetic coatings thereon while the disk is rotating. Each of the heads is disposed on either side of the disk. The head supporting structure allows one of the heads to rock about a radial axis with respect to the disk, i.e., pitching, and to rock about a circumferential axis with respect to the disk, i.e., rolling, as well as to move in the direction normal to the disk face. On the other hand, the other head is allowed to pitch and move normally to the disk face but prevented from rolling. Thus, it is possible to minimize the radial dislocation of the head core with respect to the recording tracks, while effectively ensuring follow-up characteristics of the head.

7 Claims, 6 Drawing Sheets

(a)

(c)

(b)

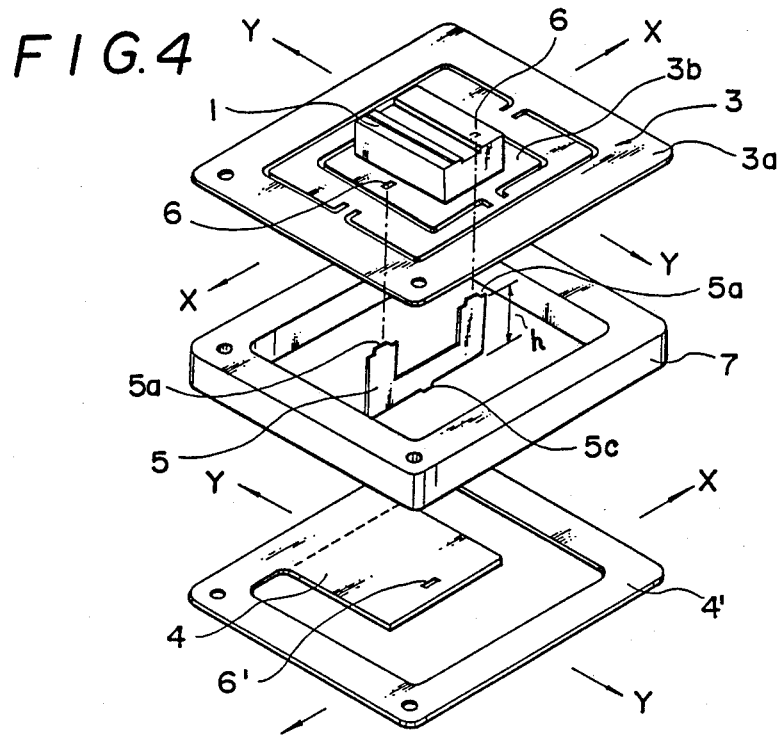
FIG. 4
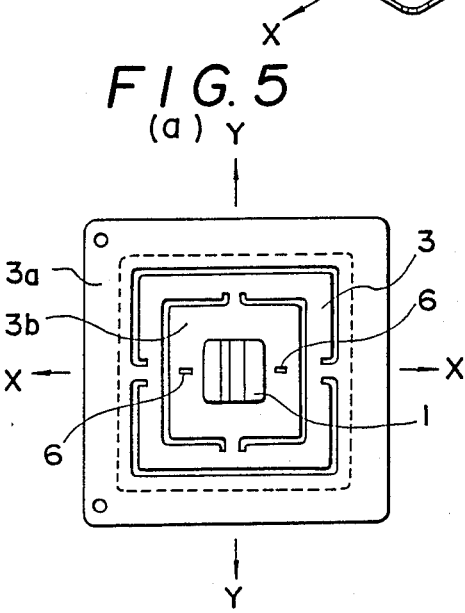
FIG. 5(a)
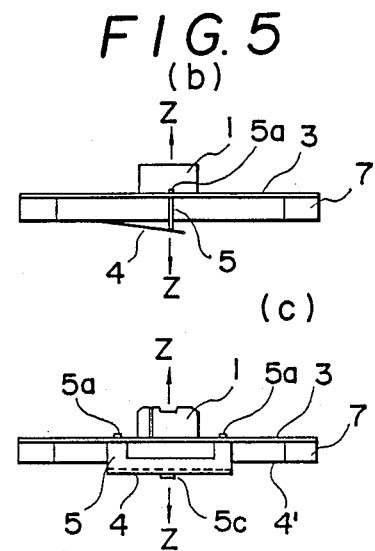
FIG. 5(b)
FIG. 5(c)

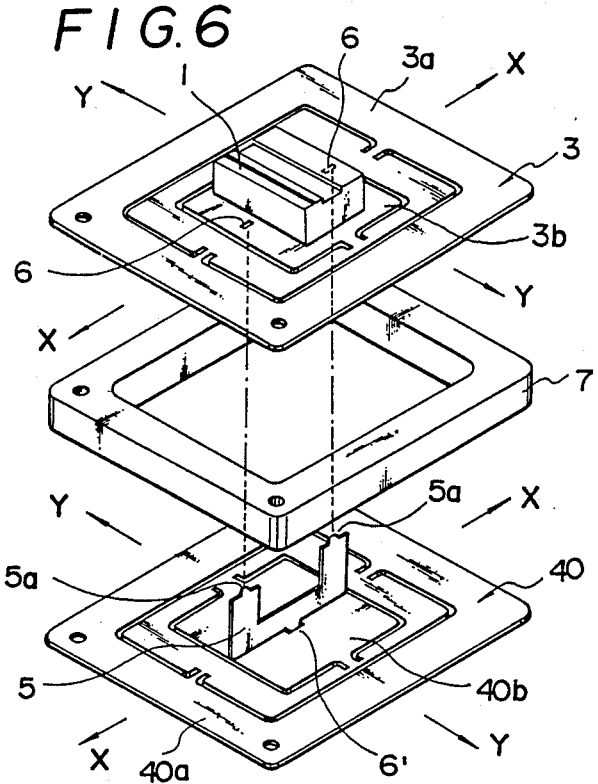
FIG. 6
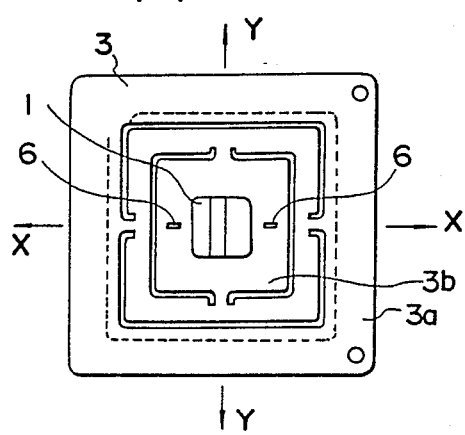
FIG. 7 (a)
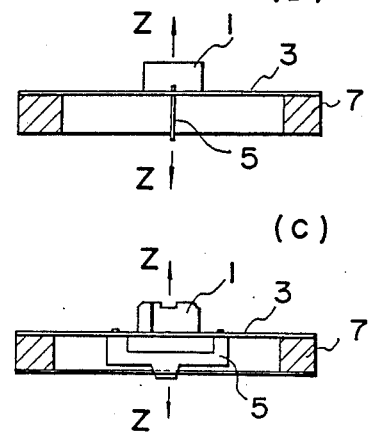
FIG. 7 (b)
FIG. 7 (c)

HEAD SUPPORTING STRUCTURE IN DISK DRIVE SYSTEM FOR DOUBLE SIDED FLEXIBLE DISK

BACKGROUND OF THE INVENTION

1. Field of the Invention

The present invention relates to a head supporting structure for use in a disk drive system for double sided flexible disks. More particularly, the present invention pertains to a supporting structure for a dual magnetic head utilized for writing and reading data on a flexible disk which is a disk-shaped magnetic recording medium used in office automation equipment, for example, computers, word processors and so forth.

2. Description of the Related Art

Several different types of head supporting structure of the kind described above have heretofore been known. A critical consideration lies in how to allow the read/write (R/W) head to follow faithfully the surface of the flexible magnetic disk when rotating. A typical prior art will be described hereinunder.

The specification of U.S. Pat. No. 4,089,029 (first prior art) discloses a head supporting structure for the "0"-side of a flexible disk (hereinafter referred to as a "medium") as well as a head supporting structure for the "1"-side of the medium. The head supporting structure for the "0"-side and that for the "1"-side have the same structure except for the location of the head core for the "0"-side and that for the "1"-side.

More specifically, the head for the "0"-side and that for the "1"-side are supported by respective cantilever spring gimbals. The proximal portion of the "0"-side centilever spring gimbal and that of the "1"-side cantilever spring gimbal are fixed to respective arms which face each other across the medium. The heads are moved in contact with both sides of the medium, thereby magnetically writing or reading data on the medium.

According to the head supporting structure shown in the first prior art, both the cantilever spring gimbals are considerably flexible and therefore capable of following a relatively slight wobbling motion or a slight circumferential or radial distortion of the medium. The prior art is also capable of reducing the head load force (i.e., the force of contact of the head with the medium).

However, the prior art has the problems that, if the wobbling of the head is relatively large due to excessive warps or undulations of the medium, or if positioning of the medium relative to the head is inaccurate, the head is offset in the radial direction of the medium, resulting in inferior recording contact between the head and the medium.

The specification of U.S. Pat. No. 4,151,573 (second prior art) discloses an arrangement in which a carriage is installed at the "0"-side of a medium so as to be movable in the radial direction of the medium, and a button-shaped head is fixed to the carriage in such a manner that the buttonshaped head is in contact with the medium. Another head is disposed so as to be movable in contact with the "1"-side of the medium. The head is fixed on a cantilever spring gimbal which is held on the distal end of an arm. One end of the arm is hinged to the proximal end portion of the carriage. The head has a projection projecting from the center of its back, the projection being pressed by a pivot fixed on the arm. The force applied to the pivot is generated by pressing the whole of the arm with a coil spring.

The head supporting structure according to the second prior art has the advantages that the structure is simple and, since the head which is in contact with the "0"-side of the medium is fixed directly on the carriage, there is no fear of the head core being displaced in the radial direction of the disk. Accordingly, it is easy to set the position of the head in the radial direction of the disk and there is no fear of the head position being radially displaced due to warps or undulations of the disk.

However, in the structure according to the second prior art, the required recording contact is ensured by pressing the "1"-side head against the "0"-side head, and therefore, a comparatively high loading pressure is required to force a warped or undulated medium to come into good recording contact with the flat surface of the head for the "0"-side. Since the medium is distorted by this loading pressure, allowable loading pressure is limited. Accordingly, when the medium has excessive warps or undulations, a sligh gap may occur between the medium and the head surface even if the greatest allowable loading pressure (e.g., 20 to 25 g in the case of an ordinary head) is applied to the head.

Further, when the accuracy of the position of the head with respect to the medium is not sufficient, a gap can easily occur at the magnetic core gap position on the surface of the head which is in contact with the "0"-side of the medium. If the gap exceeds 0.2–0.3 $\mu$m for a medium having an ordinary recording density, recording or reproduction of data cannot be effected satisfactorily. Accordingly, in order to obtain a higher recording density for a larger capacity, the gap between the head and the medium must be reduced in inverse proportion to the increase in the recording density. For this reason, this type of head supporting structure is not suitable for high density recording.

Japanese Utility Model Public Disclosure No. 55-7140 (third prior art) discloses an arrangement in which heads are disposed so as to face both sides, respectively, of a medium. The two heads have substantially the same head supporting structure in which each head is fixed on the center of a planar spring gimbal. The feature of this prior art resides in that no particular support point is needed for the back of the head and loading force applied to the medium is generated solely by the vertical deflection of the spring gimbal. Accordingly, in this case, even if the head wobbles vertically, there is no change in the position and posture of the head core in the direction of motion of the medium unless the posture of the mounting arm changes. Since the head has appropriate flexibility in the vertical direction and is pivotal about two axes, that is, an axis parallel to the direction of motion of the medium and an axis parallel to the radial direction of the medium, it is possible to achieve a considerably good recording contact between the medium and the head and also good follow-up of the head.

However, unlike the above-described second prior art, this head supporting structure allows the head to follow warps or undulations of the medium and hence tilt or rotate (rock) about an axis parallel to the direction of motion of the medium, so that the head core gap may be dynamically dislocated slightly in the radial direction of the medium. The slight dislocation of the head core gap occurs because the head slider, which is more than 2 mm in height, is tilted about the back of the gimbal. It should be noted that, since the medium is generally accommodated in a jacket or a casing, it is difficult to further reduce the space between the gimbal and the medium surface.

The above-mentioned dynamic movement of the head core in the radial direction of the medium causes a dislocation of the head, i.e., off-tracking. As a result, severe allowance is posed on the track margin. This allowance is particularly severe in the case of a disk driving apparatus for a high density recording in which the recording density in the track radial direction [a number of tracks per inch (TPI) or a number of tracks per millimeter (TPM)] is high.

Further, in a disk driving apparatus for high density and high capacity flexible disks in which a servo tracking technology is employed, a problem occurs in the follow up control when the dynamic off-tracking is too rapid, i.e., when the off-tracking occurs at high frequency.

Japanese Patent Publication No. 58-43828 (fourth prior art) discloses an arrangement in which heads which are movable in contact with the medium are fixed at the respective centers of gimbals. One of the gimbals is supported at its reverse side by two support points which are spaced radially of the medium. Each head is pivotal only about an axis parallel to a radius of the medium. In this case, even if the medium is warped or undulated, good circumferential follow-up of the heads can be achieved. In the radial direction, the heads are not allowed to swing, thereby preventing the occurrence of dynamic off-tracking.

This structure allows only a swing motion of the heads around an axis parallel to a radius of the medium, and substantially no swing motion around an axis parallel to the circumferential direction of the medium nor wobbling in the direction normal to the medium surface is allowed. Therefore, a gap may occur between the head core and the medium when, for example, the relative height of the medium and the head changes, in the same way as in the foregoing second prior art.

To overcome the above-described problems of the prior arts, the present applicant has already proposed a novel head supporting structure in U.S. Pat. Ser. No. 07/071,418, now U.S. Pat. No. 4,807,070. The present invention is an improvement in the head supporting structure proposed by the present applicant.

SUMMARY OF THE INVENTION

The present invention is proposed to overcome the drawbacks of the above-mentioned first to fourth prior arts and the earlier application by the present applicant, while keeping the advantages thereof.

It is an object of the present invention to provide a head supporting structure which minimizes the dislocation of the head core with respect to the recording tracks in the radial direction of the disk, while effectively ensuring follow-up characteristics of the head which is movable in contact with the medium.

It is another object of the present invention to provide a high-performance head supporting structure for a high recording density head, i.e., a high circumferential density (BPI) as well as high radial density (TPO) recording head.

It is still another object of the present invention to provide a head supporting structure which is made as simple as possible.

To these ends, the present invention provides a supporting structure for a dual magnetic head for use with a disk drive system for a double sided flexible disk having: a first magnetic core head and a second magnetic core head, the first head being disposed on a first side of the flexible disk and the second head being disposed on a second side of the flexible disk; a first leaf spring gimbal for supporting the first magnetic core head, the first leaf spring gimbal allowing the first magnetic core head to pitch and to roll as well as to move normally to a data storage surface on the flexible disk; a second leaf spring gimbal for supporting the second magnetic core head, the second leaf spring gimbal allowing the second magnetic core head to pitch and to move normally to a data storage surface on the flexible disk; and a cantilever leaf spring connected to the second leaf spring gimbal, the cantilever leaf spring for preventing rolling of the second magnetic core head, wherein the improvement is characterized in that a fixed end of the cantilever is fixed at points spaced in radial direction with respect to the data storage surface, and a free end thereof is joined to a central portion of the second leaf spring gimbal at two slidable points.

By virtue of the above-described arrangement, it is possible to minimize the radial dislocation of the head core with respect to the recording tracks, while effectively ensuring follow-up characteristics of the head.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote line elements and, in which:

FIG. 4 is an exploded view showing a second embodiment of the present invention; FIG. 5(a) is a plan view of the embodiment shown in FIG. 4;

FIGS. 5(b) and 5(c) are side views of the embodiment shown in FIG. 4;

FIG. 6 is an exploded view showing a third embodiment of the present invention;

FIG. 7(a) is a plan view of the embodiment shown in FIG. 6;

FIGS. 7(b) and 7(c) are side views of the embodiment shown in FIG. 6;

DESCRIPTION OF THE PREFERRED EMBODIMENTS

The present invention will be described hereinunder in detail by way of embodiments and with reference to the accompanying drawings.

Figure 1:
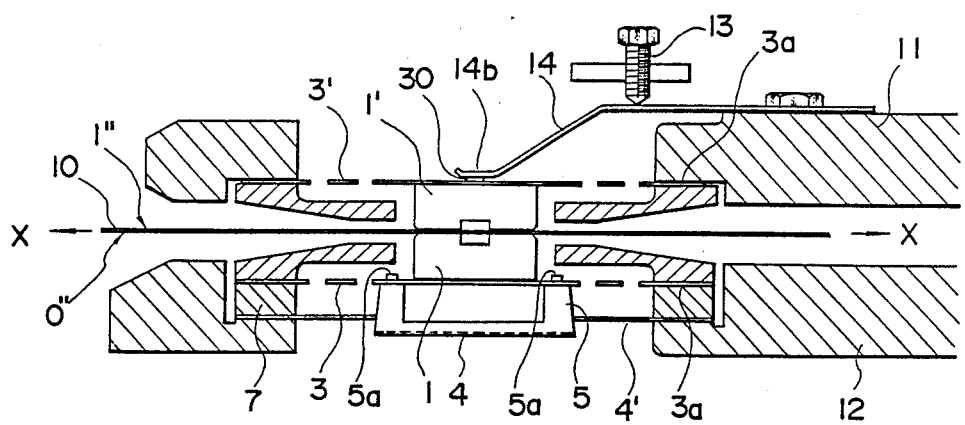
FIG. 1 is a sectional view of the head supporting structure according to the present invention, including the carriage portion thereof.
Figure 2:
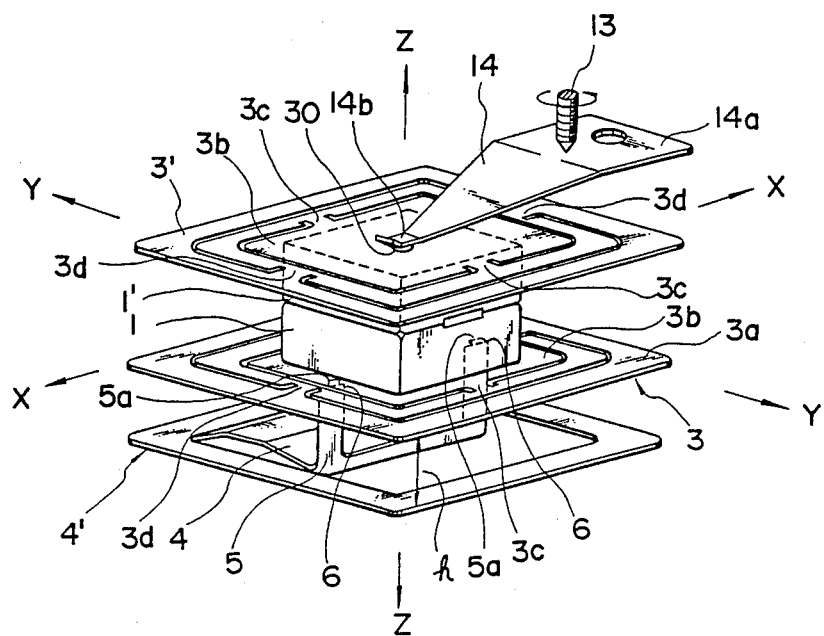
FIG. 2 is a perspective view of an essential part of the head supporting structure.

FIG. 1 is a sectional view of one embodiment of the carriage structure according to the present invention, while FIG. 2 is a perspective view of an essential part of the carriage structure. The carriage has a pair of heads 1 and 1' which will be described hereinafter. The carriage is slidable in the direction normal to the tracks of a diskshaped flexible disk (hereinafter referred to as a "medium 10") which rotates within a jacket (i.e., the carriage is slidable in the radial direction of the medium 10). Each of the heads 1 and 1' has a read/write core for reading or writing codes magnetically on the medium 10. The heads 1 and 1' are fixed on the respective central portions of supporting members 3 and 3'. The supporting member 3 is fixed on the opening portion of a lower arm 12 at its peripheral portion 3a. Similarly, the supporting member 3' is fixed on the opening portion of an upper arm 11.

As shown in FIG. 2, the central portion 3b of the supporting member 3' is capable of rolling [about an axis parallel to the direction (the Y—Y axis) tangential to the direction of rotation of the medium 10] and also pitching [about an axis parallel to the radial direction (the X—X axis) of the disk-shaped medium 10]. However, the supporting member 3 is incapable of rolling (about the Y—Y axis), as described later. The central portion 3b has pivot portions 3c at both ends, respectively. Thus, when the heads 1 and 1' rock about the Y—Y axis due to a bend or the like of the medium 10, the central portion 3b also rocks about the Y—Y axis. In consequence, the pivot portions 3c are twisted by the action of twisting torque to follow the rocking of the central portion 3b. Similarly, when the central portion 3b rocks about the X—X axis in response to the rocking of the heads 1 and 1' about the X—X axis, pivot portions 3d pivot about the X—X axis.

Accordingly, when the central portion 3b tilts at a certain angle, the tilting motion is converted to biaxial pivoting motion of the pivot portions 3c and 3d. Further, the central portion 3b is free to move in the direction perpendicular to the surface of the medium 10, i.e., the direction perpendicular to both the X—X and Y—Y axes, that is, it is movable in the Z—Z direction. Thus, the supporting members 3 and 3' function as spring gimbals. The back of the central portion 3b of the supporting member 3' for the head 1' is contacted and thereby supported by a projection 30. The projection 30 is provided on the distal end 14b of a loading spring 14. The end portion 14a of the spring 14 is secured to the upper arm 11 by bolts or other known means. The spring 14 presses the central portion 3b of the spring gimbal 3' so that the central portion 3b is biased in the direction of the Z—Z axis.

More specifically, the spring 14 biases the head 1' so as to press against the medium 10. The level of biasing force of the spring 14 is adjusted by turning an adjusting bolt 13. On the other hand, the head 1 is disposed on the "0"-side of the medium 10. The head 1 is fixed on the central portion 3b of the spring gimbal (supporting member) 3. The back of the central portion 3b of the spring gimbal 3 is supported by two projecting points 5a provided on a cantilever leaf spring 4 [see FIG. 2]. The cantilever leaf spring 4 may be manufactured by known means such as blanking or etching.

Since the spring gimbal 3 is supported through the projections 5a, it is prevented from rocking about the X—Z plane. The cantilever leaf spring 4 is formed so as to extend in the circumferential traveling direction (the Y—Y direction) of the medium 10, and the distal end portion of the spring 4 is bifurcated and bent upward to define a spacer 5 having an appropriate height (h). The spacer 5 is formed integral with a spacer supporting plate 4'. The upper end of the spacer 5 bears at two (or more) points the central portion 3b of the spring gimbal 3 supporting the head 1 in a direction substantially perpendicular to the plane of the central portion 3b in such a manner that the upper end of the spacer 5 extends across the lower side of the head 1 [see FIG. 3(a)]. The height (h) of the spacer 5 measures 2-3 mm in this embodiment.

Figure 3:
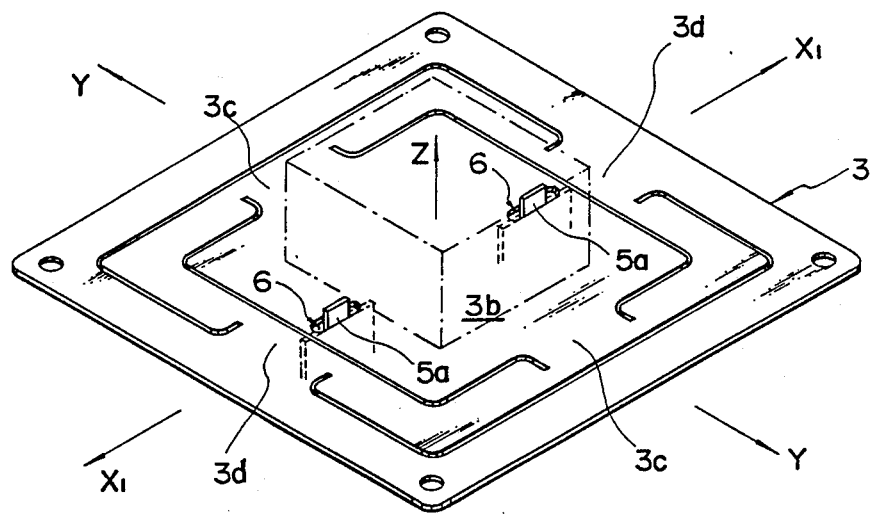
FIG. 3(a) is a perspective view showing the joints of one gimbal and the spacer.
FIG. 3(b) is a sectional view of one joint.
FIG. 3(c) shows the movement of the spacer in the case where the head moves in the Z—Z direction.
Figure 3:
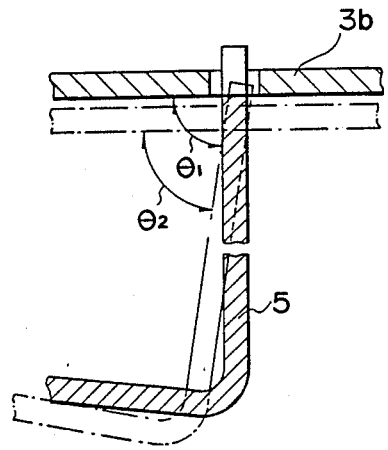
Figure 3:
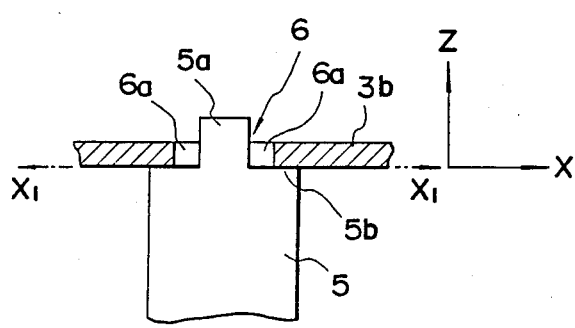

As shown in FIG. 3(a), two slots 6 are bored in the gimbal 3 for supporting the head 1 for the "0"-side at two respective positions which are spaced apart from each other in the X—X direction (the radial direction of the medium 10). The projections 5a provided at the upper end of the spacer 5 are inserted into the respective slots 6 in such a manner that the distal ends of the projections 5a project from the upper surface of the gimbal 3. The projections 5a have a rectangular configuration as illustrated. The spacer 5 has step portions 5b which are contiguous with the respective projections 5a. The step portions 5b are in contact with the lower surface of the central portion 3b. When the projections 5a are inserted into the respective slots 6, there are ensured clearances 6a in the X direction [see FIG. 3(b)].

The head 1 pitches along the curved surface of the medium 10, and this pitching motion causes the surface of the central portion 3b to tilt. As a result, the lower surface of the central portion 3b and the step portions 5b bearing it are separated from each other on the one side and they are pressed against each other on the other side. This means that the surface of the central portion 3b supporting the head 1 is tiltable at a desired angle. However, since the cantilever leaf spring 4 has a high polar sectional modulus Zp, i.e., a high rigidity, against twisting about the Y—Y axis, the central portion 3b is unlikely to rock about the Y—Y axis. Thus, the head 1 is unlikely to roll within the Z—X plane.

As has been described in relation to the prior arts, if the head is allowed to be completely free to move, off-tracking or other problems occur. In this embodiment, therefore, the head supporting structure is arranged such that the head 1 is unlikely to roll within the Z—X plane, that is, the head 1 is semi-fixed with respect to one of the three axes. Rolling of the head 1 within the Z—X plane means rocking of the head 1 within a plane which includes the radial direction of the medium 10 and the direction perpendicular to the medium surface.

Since the write/read operation of the head 1 is carried out in the circumferential direction of the medium 10, even if rolling of the head 1 within the Z—X plane is prevented, the head 1 seldom separates from the surface of the medium 10.

The heads 1 and 1' have various vibrations in addition to the above-mentioned rocking motions The lower surface of the spring gimbal 3 and the surfaces of the step portions 5b slide relative to each other in the X direction while slightly rubbing against each other. The rubbing taking place between the spring gimbal 3 and the step portions 5b is solid friction. Therefore, when vibration in the X direction is generated by resilient force from the spacer 5 or the like, the vibration is damped by the frictional resistance. Further, since the spacer 5 is a kind of cantilever which is supported by the cantilever leaf spring 4, the spacer 5 has a large modulus of section, i.e., large Z, with respect to bending in the direction of the X—X axis and therefore is highly resistant to bending. However, the modulus of section with respect to bending in the direction of the Z—Z axis is small and therefore the spacer 5 is readily deflected in the Z direction. If the spacer 5 is deflected in the direction of the Z—Z axis, the spacer 5 rocks about the $X_1$-$X_1$ axis within the range defined between the angles $\theta_1$ and $\theta_2$ [see FIG. 3(c)]. Since the motion of the cantilever leaf spring 4 may cause resonant vibration under certain conditions, it is preferable to damp such vibration by, for example, providing an adhesive material on the step portions 5b and the projection 30.

Second Embodiment

The spacer 5 for supporting the head 1 in the abovedescribed embodiment is formed by extending the spring 4 and bending the extended portion at substantially right angles. However, the structure of the spacer 5 is not necessarily limited to the above. Another embodiment of the structure for supporting the head 1 will be shown hereinunder. FIGS. 4 and 5 show another example of the spacer 5. As illustrated, a cantilever leaf spring 4 and a spacer 5 are made as separate parts. A tapered projection 5c which is provided at the center of the lower end of the spacer 5 is inserted into a slot 6' provided in the distal end portion of the cantilever leaf spring 4, the slot 6' extending in the X direction.

Accordingly, the tapered projection 5c and the slot 6' form in combination a non-slidable joint. As will be understood from FIGS. 5(b) and 5(c), the cantilever leaf spring 4 is readily deflected in the direction of the Z—Z axis because the spacer 5 is connected to the distal end of the cantilever leaf spring 4 at one point, that is, the projection 5c. However, the head 1 is unlikely to roll (about the Y—Y axis). If the spring gimbal 3, the cantilever leaf psring 4 and the spacer 5 are assembled into a unit in the first step and the unit is then set on the arm 12, the assembling is facilitated. The projections 5a are inserted into the respective slots 6 with clearances in the same way as in the above-described first embodiment.

Third Embodiment

FIGS. 6 and 7 show still another embodiment of the spring gimbal 3 for supporting the head 1 for the "0"-side. In this embodiment, a third spring gimbal 40 similar to the spring gimbal 3 is provided at the back of the spring gimbal 3 in place of the cantilever leaf spring 4 shown in FIGS. 4 and 5. The spring gimbal 3 and the third spring gimbal 40 are spaced apart from each other by a predetermined gap (i.e., the height of the gimbal supporting plate 7). The head supporting spring gimbal 3 and the third spring gimbal 40 are connected through the spacer 5 so that it is possible to prevent rolling about the Y—Y axis, that is, the direction of motion of the medium.

The gimbal 40 which is spaced apart from the head supporting spring gimbal 3 by a predetermined distance and disposed parallel thereto is secured at its peripheray 40a. The central portion 40b is movable in the direction of the Z—Z axis and pivotal about the X—X axis but is not pivotal about the Y—Y axis. Accordingly, if the spring gimbal 3 and the third spring gimbal 40 are connected together through the spacer 5 provided between the respective central portions of the two gimbals, the head 1 is prevented from rolling within the X—Z plane. On the other hand, the head 1 is capable of sufficiently following swing motion about the X—X axis (within the X—Z plane) and displacement in the direction of the Z—Z axis in the same way as in the foregoing embodiments.

It should be noted that, although in the abovedescribed embodiments the spring gimbals 3 and 3' for supporting the heads 1 and 1' are defined by square spring gimbals supported so as to be pivotal about two axes, i.e., the X—X axis and the Y—Y axis, the spring gimbals may have a square, circular or any other configuration. In some cases, a cantilever leaf spring gimbal may be employed, as described later.

Fourth Embodiment

Figure 8:
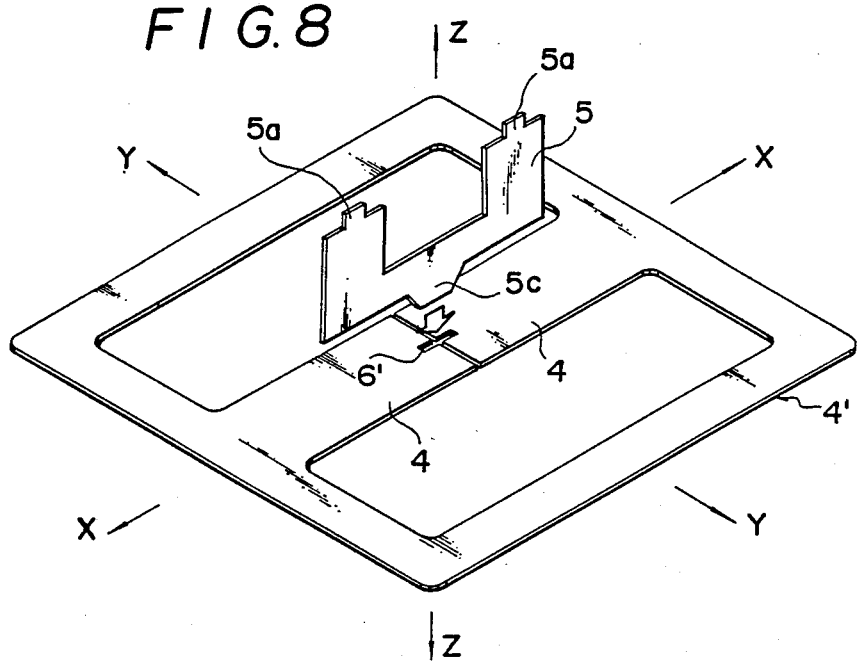
FIG. 8 is an exploded view showing a fourth embodiment of the present invention.
Figure 9:
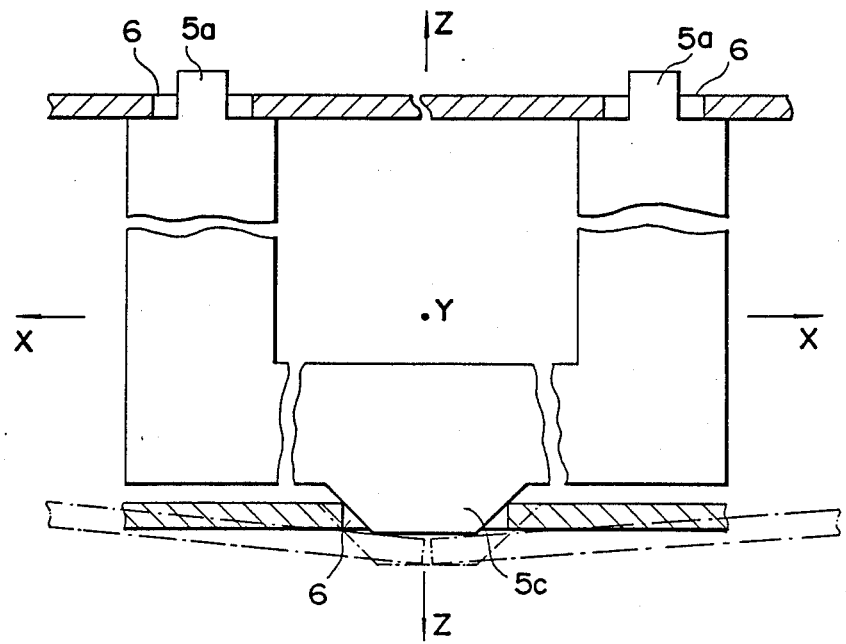
FIG. 9 is a sectional view showing the way in which constituent elements of the fourth embodiment are joined together with the spacer assembled thereinto.

FIGS. 8 and 9 show a fourth embodiment of the present invention. The above-described spacer 5 is supported by the spacer supporting plate 4'. The spacer supporting plate 4' in this embodiment is arranged such that notches are provided in the respective distal end portions of two opposing cantilever leaf springs 4 so as to define a slot 6' by the two notches. The projection 5c provided at the lower end of the spacer 5 is inserted into the slot 6'. The projection 5c is tapered so that the distal end thereof is narrowed. With the projection 5c inserted into the slot 6', the spacer 5 is prevented from moving in the direction of the X—X axis.

The projections 5a provided at the upper end of the spacer 5 are inserted into the respective slots 6 provide in the central portion 3b to form a pseudo-triple link mechanism as shown in FIG. 9. When the spacer 5 presses the cantilever leaf springs 4 in the Z—Z direction, the springs 4 move as shown by the one-dot chain line. However, since the torsional rigidity against rocking about the Y—Y axis is higher than those against rocking motions about other axes, the link mechanism is unlikely to rock about the Y—Y axis.

Fifth Embodiment

Figure 10:
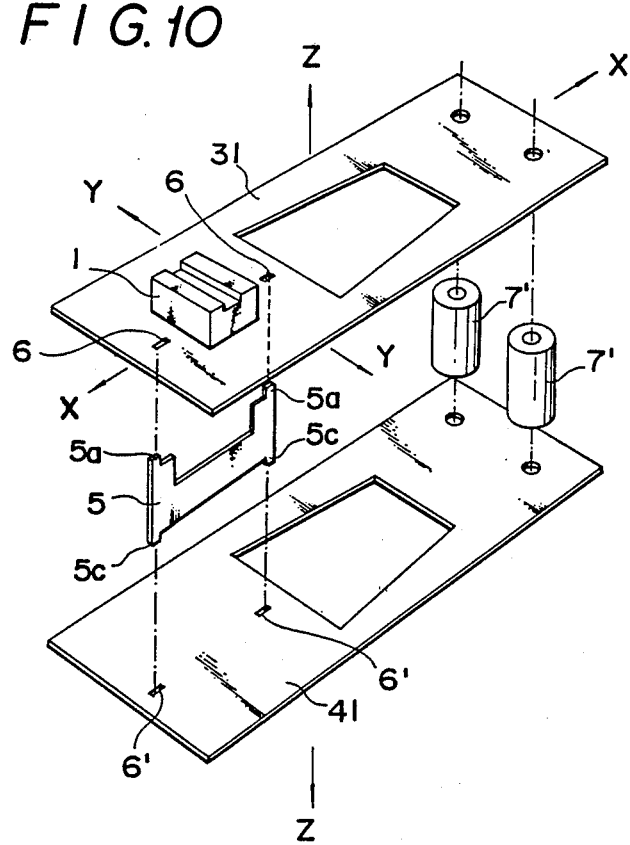
FIG. 10 is an exploded view showing a fifth embodiment of the present invention.
Figure 11:
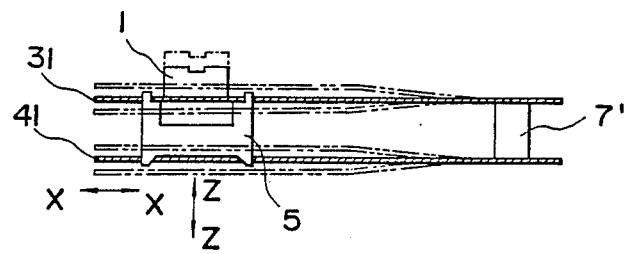
FIG. 11 shows an action of the embodiment shown in FIG. 10.

FIGS. 10 and 11 show a fifth embodiment in which a cantilever leaf spring type gimbal is employed.

This type of gimbal 31 has the drawback that it is liable to rotate within a plane including the radial direction of the medium and the direction perpendicular to the medium surface, as has been described in relation to the first prior art. As illustrated, the head 1 is fixed on the cantilever leaf spring type gimbal 31. The gimbal 31 and another cantilever leaf spring 41 are disposed parallel to each other at a predetermined spacing through gimbal supporting members 7'. If the gimbal 31 and the cantilever leaf spring 41 are joined together through a spacer 5, the head 1 is prevented from rolling within the Z—X plane.

In this case, projections 5a provided on the upper end of the spacer 5 are loosely inserted into two or more slots 6, respectively, which are provided in the head supporting cantilever leaf spring gimbal 31 such that the slots 6 face each other across the head 1 in the radial direction of the medium in the same way as in the foregoing embodiments. Projections 5c provided on the lower end of the spacer 5 are non-slidably inserted into slots 6', respectively, which are provided in the cantilever leaf spring 41. Even if the head 1 wobbles vertically, the quadrangle that is defined by the upper and lower cantilever leaf springs 31, 41 and the spacer 5 is maintained substantially in the shape of a parallelogram. In particular, there is no fear of the spacer portion tilting (pivoting) within the Z—X plane.

In this case, rolling of the head can be prevented even more completely by joining together the lower end of the spacer 5 and the lower cantilever leaf spring 41 at two or more points as in the case of the gimbal 31. The spacer 5 and the lower cantilever leaf spring 41 are non-slidably joined together by means of fitting engagement between the tapered projections 5c of the spacer 5 and the slots 6' in the cantilever leaf spring 41. If the spacer 5 and the cantilever leaf spring 41 are joined together at two points spaced apart from each other in the X—X direction, it is possible to ensure the freedom with which the head picthes (about the X—X axis). Thus, it is possible to obtain a desired head supporting structure which allows the head to move along the Z—Z axis (shown in FIG. 11 by the two-dot chain lines) and which prevents the head from rolling within the Z—X plane.

As has been described in detail, according to the present invention, a gimbal that supports a head is borne at its back through a spacer so as to make rigid the head against rotation about one axis. Therefore, the head is allowed to follow faithfully warps and undulations of the medium. In particular, since the head is prevented from rolling within a plane including the direction normal to the medium and an axis parallel to the radial direction of the medium, it is possible to minimize the radial dislocation of the head with respect to the recording tracks.

Although the present invention has been described through specific terms, it should be noted here that the described embodiments are not necessarily exclusive and various changes and modifications may be imparted thereto without departing from the scope of the invention which is limited solely by the appended claims.

What is claimed is:

1. A supporting structure for a dual magnetic head for use with a disk drive system for a double sided flexible disk (10) having:
   a. a first magnetic core head (1') and a second magnetic core head (1), said first head (1') being disposed on a first side (1") of said flexible disk (10) and said second head (1) being disposed on a second side (0") of said flexible disk (10), said first side (1") comprising a first data storage surface and said second side (0") comprising a second data storage surface;
   b. a first leaf spring gimbal (3') for supporting said first magnetic core head (1') said first leaf spring gimbal (3') allowing said first magnetic core head (1') to pitch and to roll as well as to move normally to said first data storage surface;
   c. a second leaf spring gimbal (3) for supporting said second magnetic core head (1), said second leaf spring gimbal (3) allowing said second magnetic core head (1) to pitch and to move normally to said second data storage surface (0"), and
   d. a cantilever leaf spring (4) connected to said second leaf spring gimbal (3), said cantilever leaf spring (4) preventing rolling of said second magnetic core head (1),
   wherein a first end of said cantilever leaf spring is fixed at places placed apart in a radial direction with respect to said disk (10), said cantilever leaf spring provided with a second end, remote from said first end, slidably connected to a central portion (3b) of said second leaf spring gimbal (3) to form slidable joints.

2. The structure of claim 1 wherein said second end constitutes a spacer (5) between said cantilever leaf spring (4) and said central portion (3b), a bottom end (5c) of said spacer is non slidably connected to said cantilever leaf spring (4) at a first location (6) and an upper end (5a) of said spacer (5) is connected to said slidable joints.

3. The structure of claim 2 wherein said second leaf spring gimbal (3), said cantilever leaf spring (4), and said spacer (5) are in a unit adapted to be mounted on a carriage arm (11, 12).

4. The structure of claim 1 wherein said slidable joints comprise a plurality of slots (6) provided on said second leaf spring gimbal (3) and a plurality of tapered projections (5a) in said slots, said slots (6') being in a radial line with respect to said disk.

5. The supporting structure for a dual magnetic head for use with a disk drive system for a double sided flexible disk (10) having:
   a. a first magnetic core head (1') and a second magnetic core head (1), said first magnetic core head (1') being disposed on a first side (1") of said flexible disk (10) and said second magnetic head (1) being disposed on a second side (0") of said flexible disk (10), said first side (1") comprising a first data storage surface, and said second side (0") comprising a second data storage surface;
   b. a first leaf spring gimbal (3) for supporting said first magnetic core head (1') said first leaf spring gimbal (3') allowing said first magnetic core head (1') to pitch and to roll as well as to move normally to said first data storage surface;
   c. a second leaf spring gimbal (3) for supporting said second magnetic core head (1), said second leaf spring gimbal (3) allowing said second magnetic core head (1) to pitch and to move normally to said second data storage surface; and
   d. back-up lead spring gimbal (40) for supporting said second magnetic core head (1) and said second leaf spring gimbal (3),
   wherein a spacer (5) is between said back-up leaf spring gimbal (40) and said second leaf spring gimbal (3), a bottom end (5c) of said spacer (5) is non-slidably connected to said back-up leaf spring gimbal (40) at a first location and an upper end (5a) of said spacer (5) is slidably connected to said second leaf spring gimbal (3) to form slidable joints.

6. The structure of claim 5 wherein said slidable joints comprise a plurality of slots (6) provided on said second leaf spring gimbal (3) and in a radial line with respect to said disk (10), and a plurality of tapered projections (5a) are in said slots (6).

7. The structure of claim 5 wherein said second leaf spring gimbal (3), said back-up leaf spring gimbal (40) and said spacer (5) are a unit adapted to be mounted on a carriage arm.

* * * * *